Figure 1:
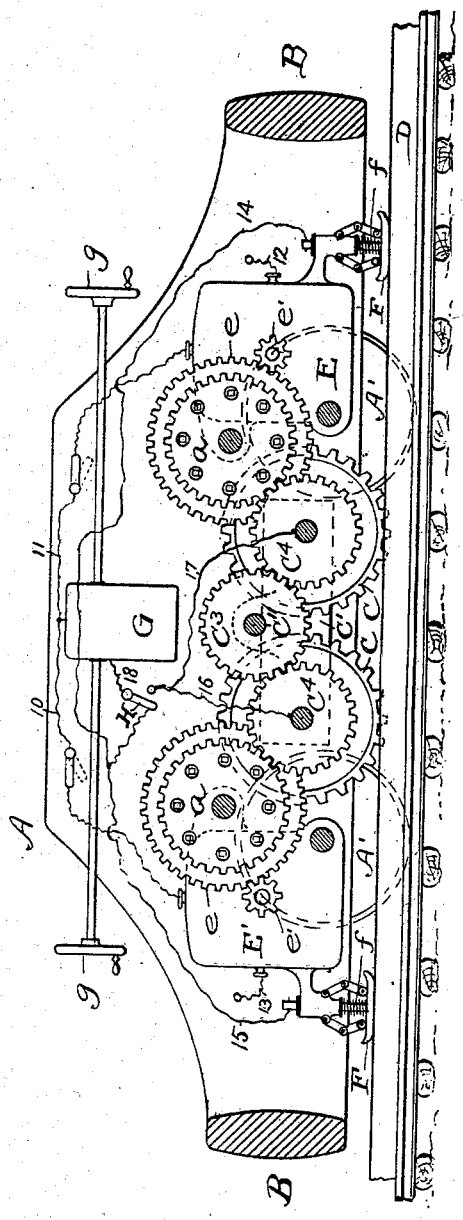

No. 716,125. Patented Dec. 16, 1902.
E. A. SPERRY.
ELECTRIC RAILWAY.
(Application filed Oct. 20, 1902.)
(No Model.) 2 Sheets—Sheet 1.

Witnesses.
E. B. Gilchrist
Howard L. Kraft

Inventor.
Elmer A. Sperry
by Parker & Carter
Attys

No. 716,125.  
E. A. SPERRY.  
ELECTRIC RAILWAY.  
(Application filed Oct. 20, 1902.)  
Patented Dec. 16, 1902.

(No Model.)

2 Sheets—Sheet 2.

UNITED STATES PATENT OFFICE.

ELMER A. SPERRY, OF CLEVELAND, OHIO.

ELECTRIC RAILWAY.

SPECIFICATION forming part of Letters Patent No. 716,125, dated December 16, 1902.

Application filed October 20, 1902. Serial No. 127,933. (No model.)

*To all whom it may concern:*

Be it known that I, ELMER A. SPERRY, a citizen of the United States, residing at Cleveland, in the county of Cuyahoga and State of Ohio, have invented a certain new and useful Improvement in Electric Railways, of which the following is a specification.

My invention relates to a system of electric-railway propulsion and control, and has for its object the production of a new, efficient, and economical system of this description.

My invention is illustrated in the drawings, wherein—

Figure 1 consists of a side elevation in part section, illustrating a car and associated parts, illustrating one form of my invention. Fig. 2 is a plan view of the operating mechanism within one end of the car, this mechanism being duplicated in the other end. Fig. 3 is a diagrammatic view of a portion of the electrical circuit when an automatic switch is used. Fig. 4 is a detail of an alternate form of the collector. Fig. 5 is an isolated view of preferred form of rack shown in section.

Like characters refer to like parts throughout the several figures.

The car or locomotive (illustrated in Fig. 1) consists, preferably, of a metallic framework A, having ends B B. (Here shown in section.) The locomotive rests in the usual manner upon four or more track-wheels A'. These wheels are in the present instance simply employed as idlers or rollers for the locomotive, the propulsion depending upon the engagement of the sprocket or sprockets C C with the traction-rack D, (see also Fig. 2,) which is suitably located between or even outside of the ordinary tram-rails constituting the road-bed, running substantially parallel therewith, but insulated therefrom, and suitably anchored against longitudinal stress. The insulation of the rack D is rendered necessary from the fact that in the present device it is used to perform the additional function of transmitting electricity from the source of supply to the car, which it may serve to light, and perform other well-known functions, but principally to energize the electric motor or motors within the car. To this end also it is found essential to suitably insulate the traction-sprockets C C and their metallically-connected parts, so as to prevent short-circuiting of traction-rack D, on the one hand, whereas, on the other, it is employed to collect the electricity from such rack and deliver it to suitable translating devices when called upon to do so. This insulation may be effected by securing in any well-known manner to the metallic truck a beam or timber of wood or other similar insulating material, (indicated at C',) which in turn supports by any of the well-known means suitable journals for the shafts of the sprockets C C, together with the shaft $C^{11}$ of the wheel $C^3$, which serves to connect and cause to revolve in unison the two sprockets C C. Upon the shafts of these sprockets are suitable gears $C^4$, intermeshing with the intermediate insulating-gear $a\ a$, which are driven by the electric motors E and E' through the ordinary gear and pinion $e$ and $e'$, the former being rigidly secured to the gear $a$, though insulated therefrom by any of the well-known methods—for instance, insulated bolts and block of insulation therebetween, as indicated, Figs. 1 and 3. It will thus be seen that when either one or both motors are operated the sprockets are rotated through intermediate gearing and serve to propel the car by intermeshing with the rack, which may be of any suitable form, the preferred form, however, consisting of a flat-topped perforated structure, (illustrated in Fig. 5,) which better serves to receive the shoes or current-collectors proper now to be described.

It will be readily understood from the well-known law of action of gear or sprocket teeth with a rack that the step-by-step action, although minute, serves to constantly break or interrupt an electric circuit when the contacting faces of the respective teeth are made to form the path of an electric current. It is also well known that each of such interruptions produces a flash, which, if the electric potentials are high, serves to burn away the metal, abrade the surfaces, and cause undue wear of the parts. I overcome this defect by employing a shunt-circuit, by means of which the main current or a portion or all of the operating-current is handled around the contacting faces of the sprockets and rack-teeth, and therefore prevented from passing such teeth, preserving the continuity and integrity of the circuit. The circuit thus being free from interruption serves far better to fulfil its function in actuating the motors, lamps, and other translating devices. The shoe is illustrated in Figs. 1 and 3, a varied form being shown in Fig. 4. It consists of the rubbing-contact F or rolling-contact F'. (See Fig. 4.) These contacts are simply spring-pressed against the upper surface of rack D in any suitable manner, the spring being illustrated at $f$ and $f'$. These shoes may be held by any suitable portion of the apparatus, so to be in proper alinement with the rack.

The plurality of sprockets, as well as shoes or contacts F, is rendered necessary in order to span the familiar breaks or gaps in the third rail, occurring at "crossovers," intersections, &c.

Passing now to the electrical circuits, which are shown in the diagram in Figs. 1 and 3, we observe that the circuit passes from the controller G, which may be suitably actuated from either end of the car by the hand-wheels $g\ g$, to the motors E and E' by wires 10 and 11, Fig. 1, and thence to the ground by wires 12 and 13. The current leaves the rack D normally by the collector F on wires 14 and 15 to the switch H, which in Fig. 3 is seen to be an automatic switch, or the current may reach this switch from the sprockets C C through wires 16 and 17 from the switch to the controller through wire 18, which in Fig. 3 is made to include the electromagnet I, which serves to attract and hold the switch H against the spring $h$. It will thus be seen that the normal current-supply to the motor is from the collectors F, but that an emergency-supply may be received from the sprocket C, or by turning the switch J both these devices may be utilized jointly to gather current from the rack D.

In Fig. 3 we find the controller in diagram with the actuating-handle, (indicated at $g'$,) the moving part, however, in this instance being supplied with an interlock, with switch H, consisting of the segment K and coöperating switch-arm H'. The operation of this interlock is at once apparent from the drawings. When once set, the switch H is held in position against the spring $h$ by either one of the two elements provided for this purpose—viz., the interlocking segment K, operating when the controller is "off" position when the motor-circuit is broken and inoperative when the controller is "on" or in any of its active positions, or by the energization of the magnet I, its coils forming a part of the motor-circuit. The use of this automatic switch varies with conditions. It often occurs that the surface of the rack having the sliding electrical connection becomes coated with non-conducting substances. Especially is this true when the car is operated in mines or excavations, and it is the object of the automatic switch to instantly transfer circuit connections of the motor from the contact-shoes F to the insulated sprocket system when for any reason during service this circuit should become opened by the accummulation of non-conducting masses under the shoes. It also in this way serves as an indicator that the shoes require attention. The interlock with the controller prevents this action when the circuit is open through the normal operation of turning off the current from the motors.

I have illustrated in detail a particular construction embodying my invention; but it is of course evident that this construction may be greatly varied and that some of the parts may be omitted and others used with parts not here shown without departing from the spirit of my invention.

By means of this invention the operation of electric-railway systems, particularly in such places as mines and tunnels, is very greatly simplified and made much cheaper and more efficient and satisfactory and permits the adaptation to circumstances and conditions not commercially possible in the ordinary electric-railway system. The arrangement of electrical control herein illustrated permits an efficient and reliable control of the motor under economical conditions and insures a certain protection and efficient action wholly absent in the ordinary electric-railway systems.

I claim—

1. An electric-railway system comprising a car or locomotive, a track therefor, an electric motor on the car, a traction-rack carrying the supply-current, associated with the track but insulated therefrom, and a plurality of connections between the car or locomotive and the traction-rack, one a mechanical connection for driving the car or locomotive and another constituting an electrical connection for supplying electricity to the car or locomotive.

2. An electric-railway system comprising a car or locomotive, a track therefor, an electric motor on the car, a traction-rack carrying the supply-current, associated with the track but insulated therefrom, a plurality of connections between the car or locomotive and the traction-rack, one a mechanical connection for driving the car or locomotive and another constituting an electrical connection for supplying electricity to the car or locomotive, and a connection between said rack and a source of electrical supply.

3. An electric-railway system comprising a car or locomotive, a track therefor, an electric motor on the car, a traction-rack carrying the supply-current, associated with the track but insulated therefrom, a plurality of connections between the car or locomotive and the traction-rack, one a mechanical connection for driving the car or locomotive and another constituting an electrical connection for supplying electricity to the car or locomotive, and a source of electrical supply connected to the rack and to the track-rails.

4. An electric-railway system comprising a car or locomotive, a track therefor, an electric motor on the car, a traction-rack carrying the supply-current, associated with the track but insulated therefrom, the rack interrupted as described, a plurality of connections between the car and the rack, one connection constituting a mechanical connection for driving the car and two other independent electrical connections for supplying the electricity to the car.

5. An electric-railway system comprising a car or locomotive, a track therefor, an electric motor on the car, a traction-rack carrying the supply-current, contiguous to the track but insulated therefrom, a mechanical engaging connection from the car to the rack for driving the car, and an electric spring-pressed connection from the car to the rack for supplying electricity to the car.

6. An electric-railway system comprising a car or locomotive, a motor on the car, a traction-rack carrying the supply-current, contiguous to the track but insulated therefrom, a plurality of connections between the car and the rack, one constituting a mechanical connection for driving the car and another constituting an electrical connection for supplying electricity to the car, and insulation between the mechanical driving connection and the return-conductor.

7. An electric-railway system comprising a car or locomotive, a motor on the car, a traction-rack carrying the supply-current, contiguous to the track but insulated therefrom, a plurality of connections between the car and the rack, one constituting a mechanical connection for driving the car and another constituting an electrical connection for supplying electricity to the car, and insulation between the mechanical driving connection and the return-conductor, and an additional electrical connection from the insulated driving part of the mechanical connection to the motor.

8. An electric-railway system comprising a car or locomotive, a motor on the car, a traction-rack carrying the supply-current contiguous to the railway but insulated therefrom, a plurality of connections between the car and the rack which may be utilized as electrical connections for supplying electricity to the car, insulation between the mechanical driving devices engaging the rack and the return-conductor, an electrical connection from the insulated part of the driving devices to the motor, and a switch for the circuits including the insulated device or devices, whereby the current supplied to the motor through these devices may be controlled.

9. An electric-railway system comprising a car, a track therefor, an electric motor on the car, a traction-rack carrying the supply-current, contiguous to the track but insulated therefrom, a plurality of connections between the car and the rack, one constituting a mechanical connection for driving the car and another constituting an electrical connection energizing the motor, insulation between the driving member of the mechanical connection and the return-conductor, a plurality of contacts on the car, one contact connected with the insulated driving member and the other with the electrical connection to the rack, and a switch for controlling said contacts whereby either electrical connection may be utilized.

10. An electric-railway system comprising a car, a track and car-wheels therefor, an electric motor on the car, a traction-rack carrying the supply-current, contiguous to the track but insulated therefrom, a plurality of connections between the car and the rack, one constituting a mechanical connection for driving the car and another constituting an electrical connection for energizing the motor, insulation between the driving member of the mechanical connection and the car, a plurality of contacts on the car, one contact connected with the insulated driving member and the other with the electrical connection to the rack, and an automatic switch device for automatically diverting the circuit from one contact to the other so as to utilize one of the electrical connections in the event the other becomes defective.

11. An electric-railway system comprising a car or locomotive, a motor on the car, a traction-rack carrying the supply-current contiguous to the railway but insulated therefrom, a plurality of connections between the car and the rack which may be utilized as electrical connections for supplying electricity to the car, insulation between the mechanical driving devices engaging the rack and the return-conductor, an electrical connection from the insulated part of the driving devices to the motor, and a switch for the circuits including the insulated device or devices, a motor-controlling switch on the car, and an interlock between the switch devices whereby one is controlled by the other.

12. An electric-railway system comprising a car or locomotive, a track therefor, an electric motor on the car, a traction-rack carrying the supply-current, associated with the track but insulated therefrom, the rack interrupted as described, a plurality of connections between the car and the rack, one connection constituting a mechanical connection for driving the car and two other independent electrical connections for supplying the electricity to the car, and switch devices for rendering either or both of said electric connections operative or inoperative.

ELMER A. SPERRY.

Witnesses:
GEORGE G. WHITCOMB,
M. S. GREENOUGH, Jr.